Nov. 23, 1926.  
W. COOPER  
FRONT WHEEL BRAKE  
Filed March 17, 1923  
1,607,665  
2 Sheets-Sheet 2
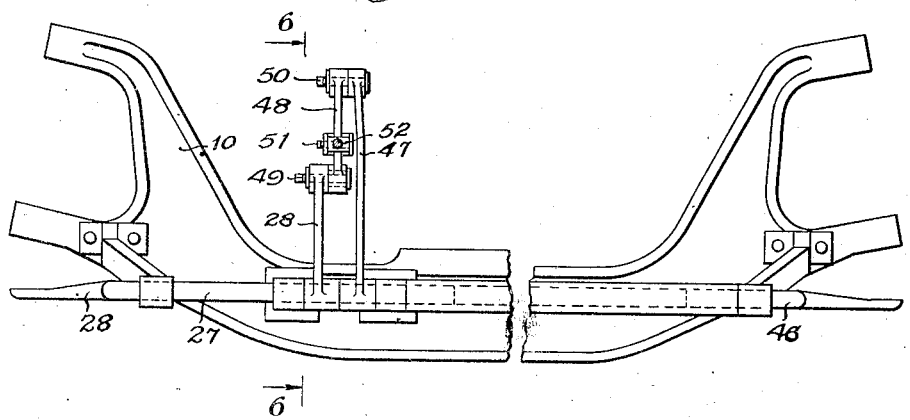
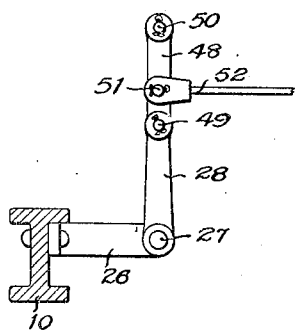
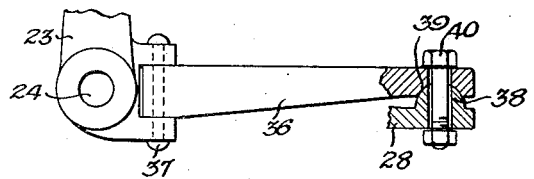
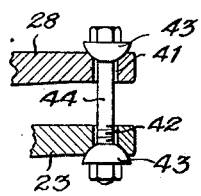
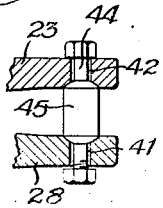
WITNESSES  
INVENTOR  
W. COOPER  
BY  
ATTORNEYS Patented Nov. 23, 1926.

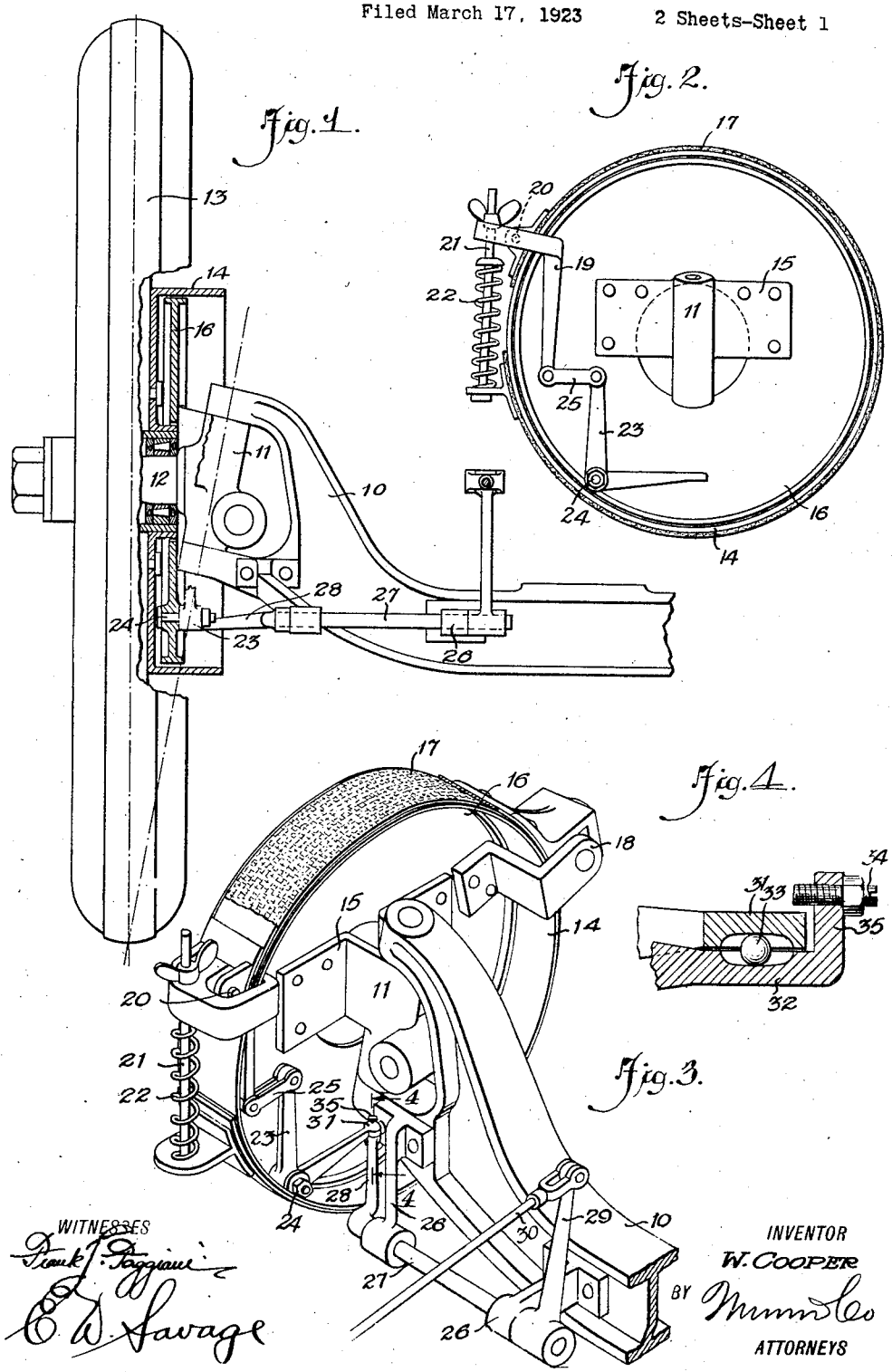

1,607,665

UNITED STATES PATENT OFFICE.

WILLIAM COOPER, OF STROUDSBURG, PENNSYLVANIA, ASSIGNOR OF ONE-HALF TO JOSEPH ALBERT MARCK, OF NEW YORK, N. Y.

FRONT-WHEEL BRAKE.

Application filed March 17, 1923. Serial No. 625,764.

This invention relates to vehicle brakes and was primarily designed as a front wheel brake for motor vehicles.

In the operation of motor vehicles, equipped with brakes in conjunction with the rear wheels only, many accidents occur due to the skidding of the vehicle when the brakes are applied. The only possible way of avoiding this objectionable feature in the braking of motor vehicles is to equip the front wheels as well as the rear wheels with brakes. When it is undertaken to equip the front wheels of motor vehicles with brakes difficulty is experienced in providing means for operating the front wheel brakes from members mounted on the frame and in conjunction with the rear wheel brakes.

The general object of this invention is the provision of a simple and efficient front wheel brake for motor vehicles for use in conjunction with the rear wheel brakes so as to give the operator greater control of his machine.

A further object of the invention is the provision of front wheel brakes for motor vehicles provided with operating members that may move transversely to one another so that the wheels may be swung about vertical axes without operating the brakes.

These objects are accomplished by fixing to the front wheel a brake drum, associating with the brake drum a brake band carried by a supporting member mounted on the steering knuckle of the vehicle, mounting on the supporting member levers for operating the brake band, providing on the vehicle frame levers for operating the brake band operating levers, and interposing between the two sets of levers a connecting member which permits transverse motion of one set of levers relative to the other.

These and other objects of the invention will be more clearly understood from the following detailed description and accompanying drawings.

Figure 1 is a vertical section through the brake, showing its construction;

Figure 2 is a side elevation of the brake, showing the levers for operating it;

Figure 3 is a perspective view of the brake;

Figure 4 is a vertical section along the line 4—4 of Figure 3;

Figure 5 is a front elevation of the levers provided for operating the front wheel brakes;

Figure 6 is a vertical section along the line 6—6, Figure 5;

Figure 7 is a section through a modified form of connecting member;

Figure 8 is a vertical section through a second modified form of connecting member;

Figure 9 is a third modification of a connecting member.

Referring to the above-mentioned drawings, 10 indicates a front axle of the ordinary type provided with forked ends. Mounted in each forked end is a steering knuckle 11, the axis of which is inclined to the vertical, as shown by the dot and dash lines. Each steering knuckle 11 carries a spindle 12 on which a wheel 13 is mounted.

The brake provided in conjunction with each wheel includes a brake drum 14 fixed to the wheel so that it revolves with it. Formed integral with the knuckle 11 is a bracket 15 for supporting an annular plate 16 in the drum 14. Encircling the brake drum 14 is a brake band 17 carried by a bracket 18 attached to the annular plate 16. An L-shaped lever 19 is pivotally connected to one end of the brake band 17 at 20. The outer end of the upper arm of the L-shaped lever is connected to the other end of the brake band 17 by a bolt 21 thus making it possible by the operation of the L-shaped lever to draw the ends of the brake band together. A spring 22 mounted on the bolt 21 forces said bolt upwardly and permits the ends of the brake band 17 to spread when the L-shaped lever 19 is released. As shown in Figure 3, the upper arm of the L-shaped lever is formed so that it will fit over the edge of the brake drum, projecting the lower arm of the L-shaped lever into the brake drum. The provision of the bolt 21 connecting one end of the brake band 17 to the upper arm of the lever 19 makes it possible to easily adjust the brake band.

A bell crank 23 is pivotally mounted on the annular plate 16 at 24. The upper end of the bell crank 23 is connected to the lever 19 by a link 25, thus making it possible to operate the lever 19 through the bell crank 23. Brackets 26 mounted on the axle 10 carry a shaft 27. An arm 28 is formed integral with the shaft 27 and this arm inclines outward so as to project beneath the lower end of the bell crank 23. Another arm 29 is mounted on the shaft 27. The arm 29 may be operated from the brake lever provided in the motor vehicle for operating the rear wheel brakes through the rod 30.

Ordinarily in the construction of motor vehicles fitted with front wheel brakes the axis of the steering knuckle is inclined to the vertical. This makes it difficult to provide a connection between the bell crank 23 and the arm 28, which will be located in line with the axis of the knuckle and which during operation will move approximately along the line of the axis. Consequently, in order to overcome this difficulty some means must be provided for connecting the lower arm of the bell crank 23 to the arm 28 which will allow transverse motion of one relative to the other. This connection between the lower arm of the bell crank 23 and the arm 28 is accomplished by providing concave heads 31 and 32 on the meeting ends of the members, respectively. The concave faces of the heads 31 and 32 face inward and a ball 33 is placed between them, as shown in Figure 4. A set screw 34 is mounted in a projection 35 formed integral with the head 32, serving to prevent the heads 31 and 32 from being widely separated from one another. When the wheels are swung about vertical axes, in order to change the direction of motion of the vehicle, there is a small transverse movement of the head 31 relative to the head 32.

Three modified forms of connecting links for connecting the bell crank to the arm 28 are shown in Figures 7, 8 and 9. The modified connecting link shown in Figure 7 includes a bell crank 23, the lower member 36 of which is hinged at 37 so that it may swing in a horizontal plane. The upper end of the arm 28 is constructed with a curved projection 38 thereon which fits into a socket 39 formed in the outer end of the arm 36. A bolt 40 is provided for attaching the members 28 and 36 together. In this case when the wheels are rotated about vertical axes, the member 36 swings on the projection 38 and hinges at 37, thus allowing a transverse movement of the members provided for operating the brake band relative to the arm 28.

In the modification shown in Figure 8, the upper end of the arm 28 extends over the end of the lower arm of the bell crank 23. Countersunk openings 41 and 42 are provided in the members 28 and 23, respectively. These countersunk openings are shaped to receive hemispherical members 43 which are mounted on a connecting link 44 provided for connecting the member 28 to the member 23. In this case when the brake band is operated through the arm 28 the connecting link 44 is in tension. As shown in the figure the openings 41 and 42 are greater in diameter than the connecting link 44. Consequently when the wheels are swung about vertical axes the member 23 may move transversely to the member 28.

Referring to the modification shown in Figure 9, the arm 28 extends beneath the end of the lower arm of the bell crank 23. Openings 41 and 42 are provided in the members 28 and 23, respectively, as in the modification shown in Figure 8. In this case the countersunk openings are adapted for receiving the curved ends of a cylindrical compression member 45 which is mounted on a connecting link 44 similar to that provided in the modification shown in Figure 8. In this case the motion of the arm 48 is conveyed to the bell crank 23 through the compression member 45. The openings 41 and 42 are considerably greater in diameter than the link 44 thus allowing the latter to swing relative to the members 23 and 28. This link 44 is of such a length that it allows a certain movement of the members 23 and 28 longitudinally of the link. Consequently when the wheels are swung about vertical axes the member 23 may move transversely of the member 28.

As set forth in a preceding paragraph, a brake of the type described would be provided in conjunction with each wheel. A shaft 27 carried by the axle 10 is provided for transmitting motion to the brake band 17 provided in conjunction with one wheel. A shaft 46 for operating the brake band provided in conjunction with the other front wheel is mounted in alinement with the shaft 27, as shown in Figure 5. An arm 47 is attached to the inner end of the shaft 46 for operating it. In order to operate the arms 47 and 28 from the brake lever provided for operating the rear wheel brakes an equalizer is provided. This equalizer includes a link 48 pivotally connected to the arms 28 and 47 at 49 and 50, respectively. In order to allow for varying angular movements of the arms 28 and 47, a sufficiently loose connection is provided at the point 49 where it is connected to the lever 28. This permits angular movement of the arm 28 relative to the arm 47. A connecting rod 52 is pivotally connected to the link 48 at 51, and the other end of the rod 52 is connected to the ordinary brake lever provided for operating rear wheel brakes. Many other devices might be provided for operating the two front wheel brakes in conjunction with the rear wheel brakes, and the above is only set forth as one means of accomplishing the operation of the front wheel brakes.

The operation of the brake is as follows:

Referring to Figure 3 in particular, the rod 30 is connected to the foot lever provided for operating the rear wheel brakes so that upon applying the rear wheel brakes a pull is exerted on the connecting rod 30, rotating the arm 29 counterclockwise about the axis of the shaft 27. The shaft 27 is thus given a counterclockwise movement which is conveyed to the bell crank 23 through the arm 28, swinging it counterclockwise about its pivot point 24. The motion of the bell crank is conveyed to the lever 19 through the links 25. This movement projects the lower end of the lever 19 to the left and since the outer end of the upper arm of the lever 19 is connected to one end of the brake band 17 while the other end of the brake band is pivotally connected in alinement with the central point of the upper arm of the lever 19 the two ends of the brake band are drawn together, gripping the brake drum 14.

I would state in conclusion that while the illustrated examples constitute practical embodiments of my invention, I do not limit myself strictly to the exact details herein illustrated since manifestly the same can be considerably varied without departing from the spirit of the invention as defined in the appended claims.

Claims.

1. In a front wheel brake, the combination with a front axle having a steering knuckle, a wheel mounted on the knuckle, a brake drum carried by the wheel, and a plate carried by the knuckle and arranged in the drum, of a brake band, means mounted on the plate and carrying the brake band, an L-shaped lever within the brake drum and having one member terminating in an angular extension extending over the outer face of the drum and pivotally connected to one end of the brake band, a bolt secured to the other end of the brake band and passing loosely through the portion of the angular extension of the lever overlying the drum and provided with a nut, a spring on the bolt, and means connected with the member of the lever within the drum for operating it.

2. In a front wheel brake, the combination with a front axle having a steering knuckle, a wheel mounted on the knuckle, a brake drum carried by the wheel, and a plate carried by the knuckle and arranged within the drum, of a brake band carried by said plate, an L-shaped lever having its upper end extending over the outer face of the drum and pivoted to one end of the brake band, means connecting the other end of the brake band with the portion of the lever overlying the drum, a shaft having a crank arm at each end, a bell crank lever, a link connecting one arm of the bell crank lever with the end of the L-shaped lever, means for connecting the other arm of the bell crank lever with one of the crank arms of said shaft so as to allow transverse movement of one relatively to the other, and an operating rod secured to the other crank arm of said shaft.

WILLIAM COOPER.